(12) United States Patent
Fullett

(10) Patent No.: US 8,688,806 B2
(45) Date of Patent: Apr. 1, 2014

(54) PROCEDURE, APPARATUS, SYSTEM, AND COMPUTER PROGRAM FOR COLLECTING DATA USED FOR ANALYTICS

(75) Inventor: Kenneth D. Fullett, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 295 days.

(21) Appl. No.: 12/813,999

(22) Filed: Jun. 11, 2010

(65) Prior Publication Data

US 2011/0307580 A1    Dec. 15, 2011

(51) Int. Cl.
*G06F 15/16*    (2006.01)

(52) U.S. Cl.
USPC ........... 709/219; 709/217; 709/250; 370/336; 370/349

(58) Field of Classification Search
USPC ........................................................ 709/219
See application file for complete search history.

(56) References Cited

U.S. PATENT DOCUMENTS

| | | | | |
|---|---|---|---|---|
| 5,956,329 | A * | 9/1999 | Pernice et al. | 370/336 |
| 7,529,808 | B1 * | 5/2009 | Trevathan et al. | 709/217 |
| 8,073,128 | B2 * | 12/2011 | Batni et al. | 379/257 |
| 2001/0037407 | A1 * | 11/2001 | Dragulev et al. | 709/250 |
| 2002/0095454 | A1 * | 7/2002 | Reed et al. | 709/201 |
| 2003/0035409 | A1 * | 2/2003 | Wang et al. | 370/349 |
| 2009/0150904 | A1 * | 6/2009 | Champagne et al. | 719/313 |

OTHER PUBLICATIONS

D. Kristol et al., "HTTP State Management Mechanism," Network Working Group (http://tools.ietf.org/html/rfc2965) Oct. 2000—27 pages.

D. Kristol et al., "Http State Management Mechanism," Network Working Group (http://tools.ietf.org/html/rfc2109) Feb. 1997—22 pages.

"Persistent Client State HTTP Cookies," Netscape Support Documentation (http://wp.netscape.com/newsref/std/cookie_spec.html) Jun. 2005—4 pages.

* cited by examiner

*Primary Examiner* — Hua Fan
(74) *Attorney, Agent, or Firm* — Fitzpatrick, Cella, Harper & Scinto

(57) ABSTRACT

A procedure for operating a communication network including a network device that is in communication in the network with at least one user communication terminal and at least one server that server that provides content. The procedure includes receiving a message from one of the user communication terminal and the server, inserting at least one of an identifier of the user communication terminal and an identifier of the server in the message, and forwarding the message, including the at least one identifier inserted in the inserting, towards another of the user communication terminal and the server. A computer program, apparatus, and communication network also operate in accordance with the procedure.

29 Claims, 8 Drawing Sheets

Methods for Collecting Data used for Analytics

Cookie Storage Interaction Diagram

PROCEDURE, APPARATUS, SYSTEM, AND COMPUTER PROGRAM FOR COLLECTING DATA USED FOR ANALYTICS

BACKGROUND

1. Field

Example aspects described herein relate to data collection, and, more particularly, relate to procedures, apparatuses, systems, and computer programs that enable wireless and wire line network service providers (SP), such as mobile or cable providers or the like, to participate in data collection to support the analysis of subscriber behavior.

2. Description of Related Art

The collection of data, followed by the analysis of it for use in decision making, is called "analytics". In the telecommunications industry, the term analytics is commonly used to reference three forms of analytics: network, subscriber, and web analytics.

Network analytics is concerned with the performance of a telecommunications network including how and when a network is being utilized. Network analytics is typically used for network planning and diagnostics.

Subscriber analytics focuses on how and when a specific subscriber is interacting with the network. Subscriber analytics is typically used to offer personalized services such as tiered service plans with rate and usage limits, possibly based on time-of-day and application, enforce fair-usage, and as a tool to offer personalized services based on subscriber behavior and utilization.

The focus of web analytics is on how subscribers accessing websites, called visitors, are interacting with websites and web applications. Web analytics is used to identify the pages viewed by visitors, how they landed on the page, their clickpath through the website, and the like. This information is then used by publishers, marketers, and others to optimize the visitor's experience and to improve the conversion effectiveness of the website.

SUMMARY

Existing limitations associated with the foregoing, and other limitations, can be overcome by procedures, apparatuses, computer programs, and networks, according to example aspects described herein.

In one example embodiment herein, a procedure is provided for operating a communication network including a network device that is in communication in the network with at least one user communication terminal and at least one server that provides content. The procedure comprises, at the network device, receiving a message from one of the user communication terminal and the server, inserting at least one of an identifier of the user communication terminal and an identifier of the server in the message, and forwarding the message, including the at least one identifier inserted in the inserting, towards another of the user communication terminal and the server.

The network device, in one example, is at a service provider core, and the identifier of the user communication terminal is a subscriber anonymous ID. In accordance with one example embodiment the subscriber anonymous ID is constant, whereas in another example embodiment, that ID is non-constant, and can change.

The procedure further can comprise determining whether at least one of the user communication terminal and server has opted in.

Also in one example, the message is a http message, and the http message includes a GET request. Further in one example, in the inserting, the at least one identifier is inserted in the message in one of a Cookie request header and a Non-Standard Internet Assigned Numbers Authority (IANA) Request Header. The subscriber anonymous ID enables the server to recognize the user communication terminal.

In another example embodiment, in the receiving, the message is received from the user communication terminal, and in the forwarding, the message including the inserted at least one identifier is forwarded towards the server. Also in this embodiment, the procedure further comprises, prior to the receiving, first receiving the at least one identifier from the server, storing the at least one identifier, and providing the at least one identifier to the user communication terminal.

In still another example embodiment, the inserting further includes inserting an interest profile into the message, and the forwarding includes forwarding the message, including the at least one identifier and the interest profile inserted in the inserting, towards the another of the user communication terminal and the server.

The procedure additionally can comprise receiving a response to the message forwarded in the forwarding, and providing at least one content record based on at least one of the message and the response.

Also in one example, the procedure further comprises providing an interest profile based on the at least one identifier. The forwarding forwards the message towards the server, and the providing is performed in response to the server requesting the interest profile.

Additionally, in one example embodiment, the procedure further comprises receiving a response to the message from the server, customized to the user communication terminal.

According to another example embodiment herein, a procedure is provided for operating a communication network including a network device that is in communication in the network with at least one user communication terminal and at least one server that provides content. The procedure comprises, at the network device, receiving a first message from one of the user communication terminal and the server, receiving a second message from another of the user communication terminal and the server, and providing subscriber characteristic information based on identifiers included in the first and second messages.

The second messages is responsive to the first message, and the identifiers each include at least one of an identifier of the user communication terminal and at least one cookie. The procedure also can comprise storing the identifiers included in the first and second messages.

In one example, the procedure of this embodiment further comprises receiving a query including one or more identifiers, the providing includes correlating subscriber characteristic information with the one or more identifiers to provide the report, and the report includes the subscriber demographic information. In one example, the subscriber characteristic information includes characteristic information for a single subscriber, and in another example the subscriber characteristic information includes subscriber characteristic information for plural subscribers.

The example embodiments described herein provide for more reliable collection of data from which to derive web analytics through better tracking of visitors to websites over time, and improve the quality of existing analytics data by solving the identification of uniques and providing matching, anonymous demographic data, for example.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 1:
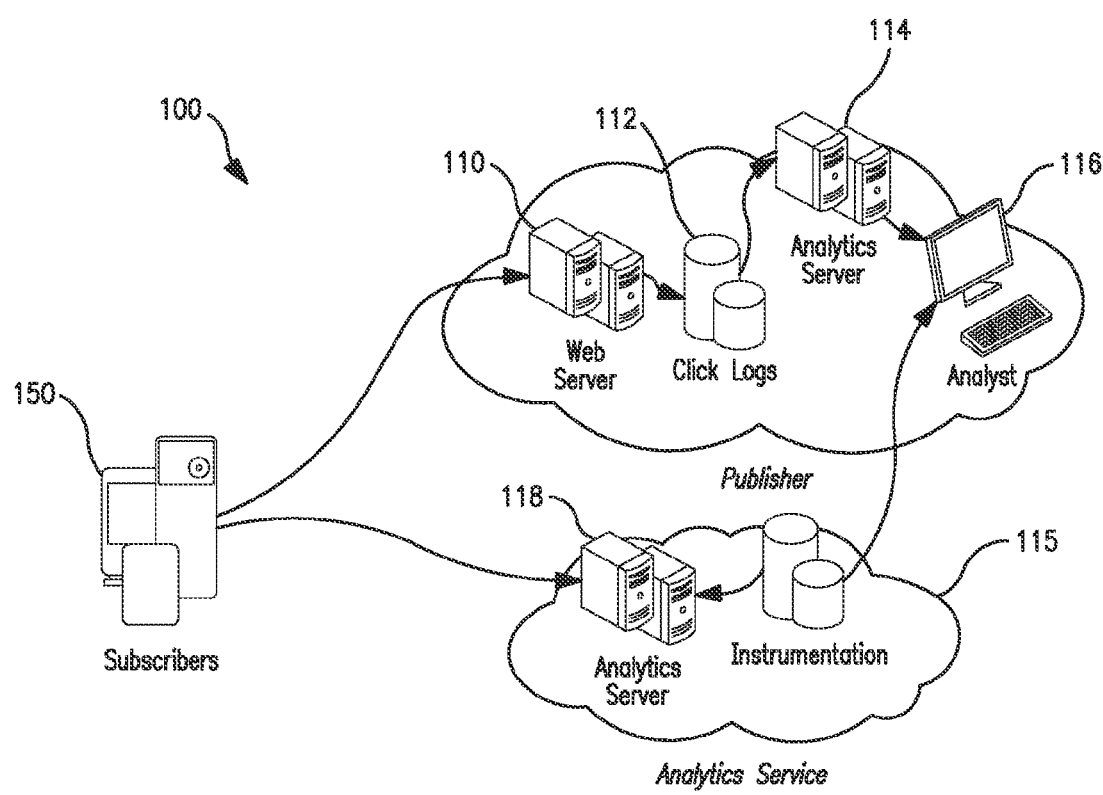
FIG. 1 is a representation of an example communication network.

Web analytics is primarily used to understand the behavior of website visitors accessing a website via a web browser (e.g. a user agent) or a smart phone application, for example. A typical system or network 100 for collecting data for analysis to provide web analytics is illustrated in FIG. 1. The upper portion of the Figure illustrates an example of publisher based collection and the lower portion of the Figure illustrates an example of the use of an analytics service.

The network 100 includes a plurality of user communication terminals (also referred to for convenience as "subscribers"), such as information appliances 150, each of which is bidirectionally communicatively coupled to one or more web servers 110 and to one or more analytics servers 118. Web server(s) 110 is bidirectionally communicatively coupled to a click log database 112, which, in turn, is bidirectionally communicatively coupled to at least one analyst 116 by way of analytics server(s) 114.

Analytics server(s) 118 are bidirectionally communicatively coupled to an instrumentation log database 115, which is bidirectionally communicatively coupled to the analyst 116. In one example embodiment, the components 110, 112, 114, and 116 are publisher equipment, and the components 118 and 115 are analytics service equipment.

Publisher-based tracking instruments program code on a web server (e.g., 110) to track a visitor's (e.g., a user of appliance 150) click-by-click navigation of a website. Typically recorded are a landing page, the referring website, pages and the order visited during a session (called the click-path), time spent on a page, subscriber's registration, and purchasing activity. This information is stored to a database, such as database 112, associated with server 114, in real time. Using a visualization tool with the database, an analyst (e.g., 116) can determine both current activities in real time and analyze long term trends.

Using an analytics service provides another method for collecting data for analysis. To use a web analytics service, the publisher instruments the HTML code executed by the browser and/or other application for each page of interest. As the user agent builds the page, it retrieves data from multiple servers, including the analytics service's server (e.g., 118). The analytics service collects the data provided by the browser, and stores it into a database (e.g., 115). In near real-time, using visualization tools normally provided by the analytics service, the analyst (e.g., 116) can view information about visitor's interaction with the website.

Publisher-based tracking has several difficulties. The publishers only have visibility to the visitors on their own site; thus, it is difficult to build a profile on the interests of their visitors or to derive demographic information unless volunteered explicitly by the visitor. In addition, it is difficult to differentiate a return visitor from a new visitor, to identify unique visitors, even with the use of various persistent visitor tracking techniques.

An analytics service offers data collection and data analysis services to many different publishers' websites, each a client of the analytics service. For this reason, the analytics service has the capability to build a more complete profile of the visitor as the visitor moves from website to website. However, the analytics service must be able to track the visitor as it moves among their clients' websites. and similar to publisher based tracking, it is difficult to differentiate a return visitor from a new visitor even with the use of various persistent visitor tracking techniques. In addition, any data derived by the analytics service is limited to the analytics service's clients' websites.

Both the publisher and analytics service can benefit from improved techniques to maintain a unique identifier for visitors to the websites and to better understand the interests and characteristics (demographics) of visitors to their websites.

The SP is at a unique location in a network having visibility to all subscriber traffic. The SP can examine the content of their subscriber's traffic to collect information, then using web analytics, can build a better understanding of the applications and websites used by their subscribers.

These possibilities are referred to as:
data enhancement, and
data collection.

Data Enhancement

One challenge for publishers, ad networks, data exchanges, analytics services, marketing services or the like, when tracking visitors, is distinguishing new visitors from returning visitors (the number of unique visitors to a site are called uniques.

Websites or the like, typically prefer to track visitors to be able to determine how to provide a more personalized experience and to collect data for web analytics to both improve the user experience and increase conversions. Owing to present day user terminal capability and network design (wireless and wireline, mobile and fixed), such tracking can be difficult to achieve, and in some cases does not work. Existing techniques also have difficulty in identifying new visitors from return visitors to websites over time and across sessions, and can over-estimate the number of unique visitors to a website. While some existing techniques attempt to reduce this error, often they introduce their own uncertainties.

There are numerous methods used to identify unique visitors, including

1. Tracking cookies—however, many user terminals do not support cookies. In addition, users will often disable cookies on the terminal devices on which they are supported. Furthermore, cookies may not be persistent across sessions as they may be cleared across browser sessions.

2. Javascript page tagging—however, most mobile terminals do not support javascript. Furthermore, javascript is often disabled and does not provide persistence across sessions.

3. IP Address—today, all mobile networks place mobile devices behind a NAT (network address translation device). NAT obfuscates mobile device's IP address so that it appears to the network that many devices are using the same IP address 4. Image tags—an image tag is embedded into the page; however, local and network caching renders this method unreliable. Furthermore, image tags are not persistent across sessions.

5. Query strings—can identify a user for a specific session but the information is not carried across sessions.

Because all messages between subscribers and servers transit the service provider's network, the SP is in a unique position to solve the subscriber identification problem. Data enhancement techniques, according to an example aspect herein, will be described below.

Data Collection

A second problem facing websites, ad networks, data exchanges, analytics services, marketing services or the like, is the lack of both sufficient interest and demographic information about the visitors to their websites.

Again, because all messages between the subscribers and the servers of the websites or the like, transits the service providers network, they are in a unique position to monitor all subscriber traffic. This enables the service provider to collect data that reflects a subscriber's interest and to apply analytics techniques to derive a profile of the subscriber's interest and their future intent called an interest profile.

In addition, a SP possesses unique demographic data about its subscribers that can be anonymously shared together with the interest profile to enhance the quality of data about the subscriber. Data collection techniques, according to an example aspect herein, will be described below.

Having briefly described data enhancement and data collection, an example aspect herein will now be described. The inventor has discovered new and useful techniques, apparatuses, systems, and computer programs that provide for more reliable collection of data from which to derive web analytics through better tracking of visitors to websites over time. Example embodiments discovered by the inventor improve the quality of existing analytics data by solving the identification of uniques and providing matching, anonymous demographic data, for example.

Cookie Insertion

Figure 2:
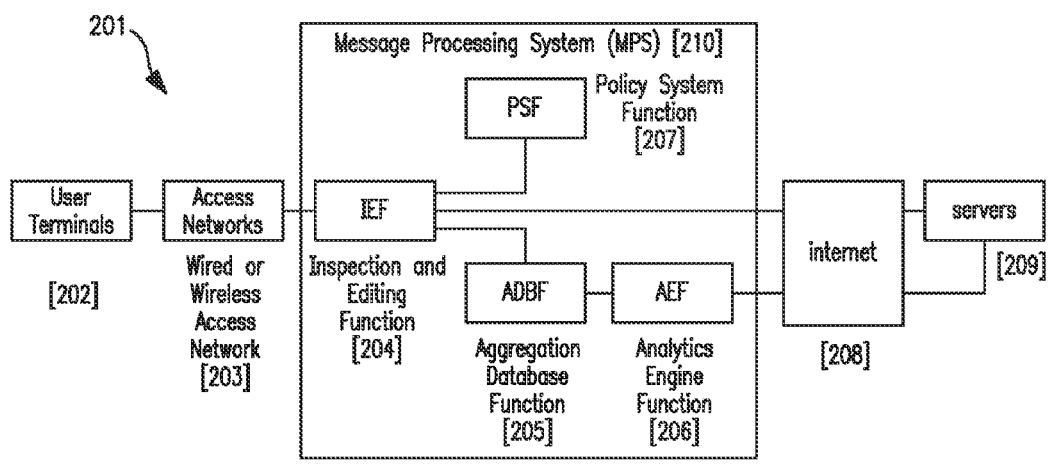
FIG. 2 is a representation of another example communication network that includes a Message Processing System (MPS) 210 constructed and operated in accordance with at least one example aspect of the invention.

This example embodiment is described using the example communications network diagram of FIG. 2. The network 201 includes a plurality of user communications terminals (also referred to for convenience as "subscribers" or "information appliances") such as User Terminals 202, one or more networks (wireless or wire line, fixed or mobile) such as Access Networks 203 and internet 208, one or more Message Processing Systems (MPS) 210, and one or more servers 209 that provide content. The User Terminals 202 each bidirectionally communicate over an Access Network 203 and interface to at least one Message Processing System (MPS) 210. The MPS 210 is bidirectionally communicatively coupled to one or more networks, such as the internet 208, and/or one or more LANs, WANs, or other types of networks, and also is bidirectionally communicatively coupled to one or more server(s) 209. The MPS is comprised of functions Inspection and Editing Function (IEF) 204, Aggregation Database Function (ADBF) 205, Analytics Engine Function (AEF) 206, and Policy System Function (PSF) 207 that are realized on one or more physical devices that comprise the MPS wherein the MPS 210 and its functions are constructed and operate according to example aspects described herein. In one example embodiment, the MPS 210 is located at a SP, in a predetermined location, such as the SP's mobile core, although in other embodiments, the MPS 210 may be located elsewhere in the network 201. The one or more networks (e.g., Internet 208) include one or more servers, such as server(s) 209, which host or otherwise provide content for one or more websites, Ad Networks, Data Exchanges, or the like. It should be noted that the example aspects described herein can be used in wireless or wireline networks, or a combination wireless/wireline network, and in conjunction with, for example, mobile network operators and multiple service operators (e.g. cable providers).

Attaching a persistent and anonymous identification to visitors to a website improves the ability of the website to track visitor behavior. This can be achieved using a function, such as IEF 204, for example, to insert persistent cookies that anonymously identify a user to the server 209, into file requests such as HTTP requests or other requests.

Normally, when a HTTP response message is sent from a website (i.e., by way of a server 209 hosting the website in network 201), for example, the website often includes a cookie in the message to uniquely identify the visitor (i.e., a user of an appliance 202 and/or the appliance 202 itself) to the website in the following example manner:

Set-Cookie: VisitId=a1ba8499-0c09-47ef-a747-d26a5ef3db0a; path=/

In a subsequent GET request signal from a browser (e.g., associated with appliance 202) to the same website, the cookie is returned to the web server to enable it to recognize the visitor as returning rather than new. The response message often contains a Cookie header in the following example manner:

Cookie: VisitId=a1ba8499-0c09-47ef-a747-d26a5ef3db0a

Thus, the cookie provides persistent identification of the visitor to the website. However, not all devices support cookies, the cookies may be deleted between sessions, and they can be disabled. According to an example aspect herein, however, a service provider can offer a persistent identifier, such as a persistent cookie, within HTTP or other file requests on behalf of website visitors. An example embodiment of a procedure according with this aspect will now be described.

In this example embodiment, when a predetermined request message, such as, in one example, a HTTP request message, is sent from a user terminal 202 in network 201 and towards the server 209 by way of the IEF 204, for example, the IEF 204 recognizes that message as a HTTP request message (or other applicable type of message) and inserts into it a Cookie request header that uniquely, and anonymously, identifies the subscriber to a partner server 209, website, ad network, data exchange, or the like, and inserts a subscriber anonymous ID (SAID) into the request header. In one realization, the SAID is constant for any particular subscriber, enabling the partner to identify all sessions associated with the visitor.

An example of participants that may be involved in one example embodiment, and their responsibilities, is represented in the following Table 1-1.

TABLE 1-1

Cookie Insertion Scenario Participant Responsibilities

| Participant | Responsibility |
| --- | --- |
| User Agent executing on a User Terminal 202 | A subscriber (e.g., 202) chooses to opt-out or opt-in of a services provider's marketing program. The subscriber might be, e.g., a visitor to a websites via a network, such as network 201. The subscriber's traffic is inspected by the IEF 204. |
| IEF 204 | The IEF 204 in one example is deployed in-line between the User Terminal 202 and server 209. The IEF 204 inspects the traffic and edits the message, e.g. HTTP requests to include a subscriber anonymous ID (SAID). |
| PSF 207 | A policy system function (PSF) stores information that is used by the IEF 204. The information includes the SAID and indicates the subscriber and partner participation. As with other functions of the MPS, the policy system can be, e.g., functionality/software, resident on one or more components in the network, such as in, e.g., MPS 210 and/or another component, and can be combined with other functionality/software therein. Thus, the policy system may be centralized or distributed, possibly with a portion of its functionality implemented on the MPS 210. In one example, the policy system is a PCRF. |
| servers 209 | The servers 209 accept requests from and provide responses to subscribers 202. A partner server is a server that is participating in a service provider's market program and has agreed to terms and conditions of the service provider. The partner may provide the SP with a partner provided value (ppv) that is stored on PSF and inserted by the IEF into request messages destined for the server. The ppv is used by the partner in any fashion it chooses, in one example, the ppv allows the SP to identify the source MPS of the message. The partner website code may be modified to take advantage of a cookie and ppv insertion. A partner website may be hosted by one or more servers, such as server(s) 209. |

For purposes of this description, in an example embodiment that will now be described, the following conditions are deemed to be present:

1. An example subscriber (e.g., 202) has chosen to opt-in to a service provider's market program.

2. In this example, there is a unique subscriber anonymous ID (SAID) assigned to the subscriber (e.g., 202) and stored in correlation with that particular subscriber, in a table in a memory of one or more of the components the MPS 210, such as in the PSF.

3. A partner (e.g., a publisher, ad network, or the like) has agreed to participate in the program with the service provider.

4. The foregoing subscriber and partner statuses are stored in the PSF 207.

Figure 3:
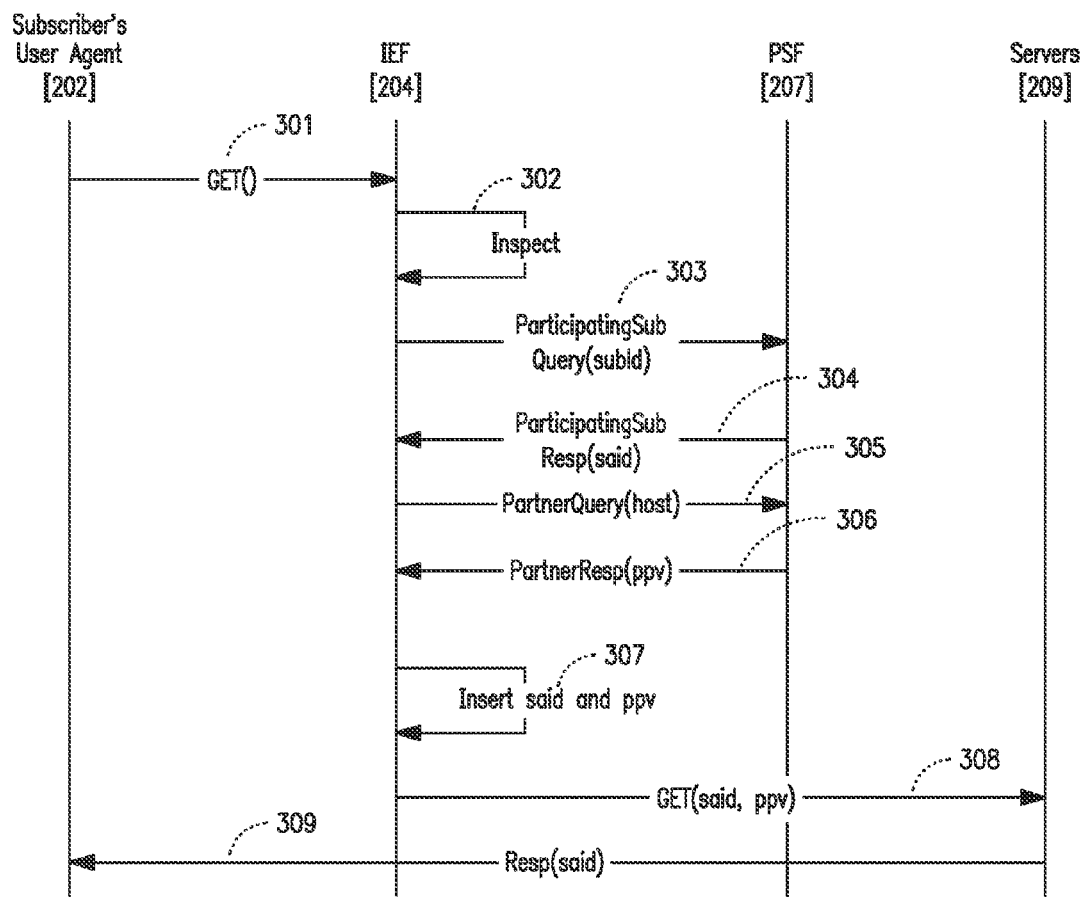
FIG. 3 is an example interaction diagram that illustrates a procedure in accordance with an example embodiment described herein, relating to cookie insertion.

An example interaction diagram representing a procedure for this example embodiment is shown in FIG. 3.

In this example embodiment, the procedure proceeds as follows (the numbers below identify the corresponding parts of the procedure in FIG. 3):

301. A user agent running on a user terminal 202 issues an HTTP request (in one example, a GET request), towards a partner's website (i.e., the partner's web server 209 hosting the website), by way of at least components 203, 204, and 208.

302. The IEF 204 inspects traffic passing there-through at one or more protocol layers (e.g., one or more of the GTP, IP, TCP, HTTP, and HTML protocol layers, or other predetermined layers of interest), to identify in the HTTP request both the absolute subscriber identity (e.g., the subscriber's currently assigned IP address[1], IMSI, or other predetermined identifier, each of which is also referred to herein as a subID) and a predetermined identifier (e.g., a URI or URL) of the destination host server 209.

[1] If NAPT is in use, the inspection can occur prior to the NAPT to preserve the identity of the subscriber.

303. The IEF 204 queries the PSF 207 providing the absolute subscriber ID (subID) to retrieve the subscriber's subscriber anonymous ID (SAID) from the PSF 207, which retrieves the SAID after correlating the subID to the SAID from the policy system.

304. The PSF 207 returns the SAID for the subscriber 202 to the IEF 204.

305. The IEF 204 queries the PSF 207 to determine if the destination server belongs to a participating partner. (In one example, this is performed by querying a look up table storing information identifying that particular partners have set up agreements with a carrier of interest.)

306. Where the server is determined by the policy system to belong to a participating partner, the PSF 207 returns a partner provided value (ppv), to be inserted via one or more predetermined headers, such as, e.g., one or more HTTP Cookie headers, into the HTTP request message. The value specified by the partner is at the partner's discretion and may be used in any fashion deemed useful by the partner.

307. The IEF 204 then responds by modifying the HTTP request to insert cookie request-headers containing the SAID and ppv, into the HTTP request message (e.g., GET request). (In this manner, the IEF 204 provides a persistent method for the server to anonymously track the subscriber using the SAID)

308. The resulting message from procedure 307 is then sent from the IEF 204 to the partner's server 209 (.e.g., the partner's web server hosting the website), The partner's server 209 recognizes the inserted cookie and its components (the SAID and ppv), where the contents of the message are stored.

309. The partner's server then provides a response back to the user Terminal 202.

The partners' server(s) will then have captured the SAID and ppv for visitors to their websites from the Cookie request header in procedure 308. This information anonymously and uniquely identifies the subscriber 202 and can be used to follow the specific subscriber 202 present and future interactions with the partner's server. In one example, for each subscriber request to the server, the example procedure of FIG. 3 is used so that each request includes the cookie with SAID and ppv. This allows the server to utilize its existing tracking cookie methods to identify the subscriber anonymously since the SAID obscures the real identify of the subscriber.

One example of a GET request that includes an inserted Cookie request header to convey the SAID and partner provided value (in procedure 308 above), is as follows.

GET/HTTP/1.1
Host: www.example.com
User-Agent: Mozilla/5.0 (Windows; U; Windows NT 5.1; en-US; rv:1.9.1.7) Gecko/20091221 Firefox/3.5.7 GTB6

Accept:text/html,application/xhtml+xml,application/xml; q=0.9,*/*; q=0.8

Accept-Language: en-us,en;q=0.5

Accept-Encoding: gzip,deflate

Accept-Charset: ISO-8859-1,utf-8;q=0.7,*;q=0.7

Cookie: SAID="DA34B23A";ppv="23B5CE69C302"

Of course, in other embodiments, other variations on the encoding can be employed. In one example embodiment, the maximum length for the SAID and ppv can be selected based on predetermined operating criteria.

Also in one example embodiment, the service provider (SP) can provide additional demographic data (e.g., age, gender), out of band, to the partner based on subscriber and partner agreements. For the preceding example, if either the server or subscriber is non-participating, the IEF does not insert the SAID or ppv into the GET request.

Non-Standard Internet Assigned Numbers Authority (IANA) Request Header Insertion In one example embodiment, the IEF 204 inserts one or more non-standard request headers, such as non-standard IANA request headers, that uniquely, and anonymously, identify one or more subscribers 202 to partner websites.

This procedure proceeds in the same manner as does the cookie insertion embodiment described above (see FIG. 3), but using a non-standard IANA request header rather than a Cookie.

An example of a GET request that uses a non-standard X-SAID header to convey the SAID and partner provided value (ppv) is as follows.

GET/HTTP/1.1

Host: www.example.com

User-Agent: Mozilla/5.0 (Windows; U; Windows NT 5.1; en-US; rv:1.9.1.7) Gecko/20091221 Firefox/3.5.7 GTB6

Accept:

text/html,application/xhtml+xml,application/xml; q=0.9,*/*;q=0.8

Accept-Language: en-us,en;q=0.5

Accept-Encoding: gzip,deflate

Accept-Charset: ISO-8859-1,utf-8;q=0.7,*;q=0.7

X-SAID: "DA 34B23A";ppv="23B5CE69C302"

A non-standard X-SAID header can be employed in lieu of a cookie header in any embodiment described herein. Of course, other variations on the encoding can be employed instead. The maximum length for the SAID and ppv can be selected based on predetermined operating criteria.

Cookie Proxy

In another example aspect, the MPS 210 can function as a cookie proxy to provide more reliable cookie handling for visitors to partners' servers. The IEF 204 handles cookies using standardized cookie-handling techniques (e.g., Cookie Netscape, Cookie RFC 2109, and Cookie RFC 2965, equivalents or later versions thereof, or other predefined standards) on behalf of the user agent (browsers) (e.g., 202) by storing and inserting cookies using the same methods required of the user agents, for example. The cookie handling normally performed by the user agent is handled transparently by the MPS 210.

A benefit of the cookie proxy technique is that it does not require any changes to the partner's server.

Participants in this example embodiment, and their responsibilities, are described in Table 1-2.

TABLE 1-2

Cookie Proxy Participant Responsibilities

| Participant | Responsibility |
| --- | --- |
| Subscriber's User Agent executing on a User Terminal 202 | Subscriber (e.g., 202) may opt-out or opt-in of the services provider's marketing program. The subscriber (e.g., 202) is a visitor to the partner's servers via, e.g., the access network and internet, in one example. |
| IEF 204 | The MPS 204 is deployed in-line between the subscriber (e.g., 204) and partner server 209. The IEF 202 inspects the traffic between the subscriber (e.g., 202) and server and performs a cookie proxy function on behalf of the subscriber's user-agent. |
| PSF 207 | The PSF stores participation information on the subscriber 202 and partner server 209 that is used by the IEF 204. As described above, the policy system may be centralized or distributed, possibly with a portion of its functionality implemented on the MPS 210. |
| Servers 209 | The servers accept requests from and provide responses to subscribers 202. Server proprietors or operators of servers include websites, ad networks, ad exchanges, or the like. A partner server is a publisher that is participating in the service provider's market program and has agreed to the terms and conditions of the service provider. A partner server is provided with cookie proxy services by the MPS 210. |

For purposes of this description, in an example embodiment the following conditions are deemed to be present:

1. The subscriber 202 has chosen to opt-in to the service provider's market program.

2. The partner (i.e., proprietor or operator of sever(s) 209) has agreed to participate in the program with the service provider.

3. The subscriber 202 and partner status are stored in the PSF 207.

Figure 4:
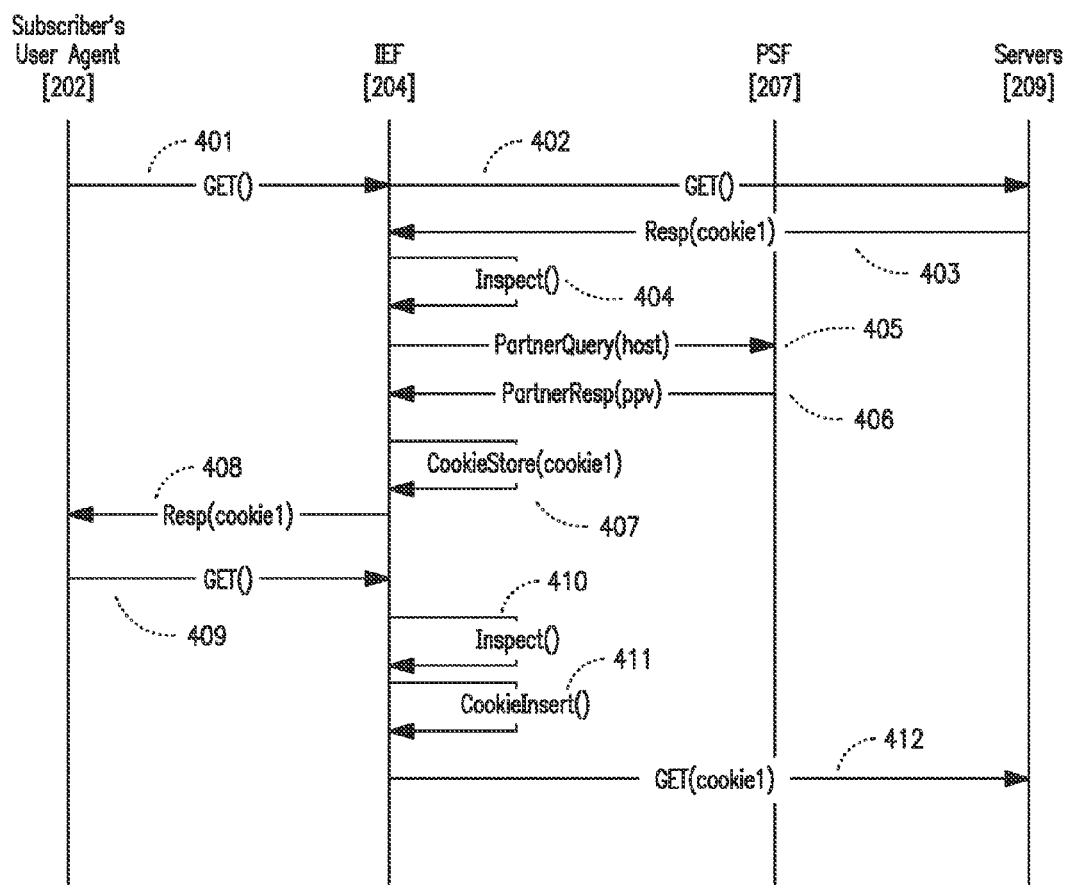
FIG. 4 is an example interaction diagram that illustrates a procedure in accordance with an example embodiment described herein, relating to a cookie proxy.

An example interaction diagram of a procedure according to this example embodiment is shown in FIG. 4. In this example embodiment, the PSF 207 and associated queries are used to determine participation of the subscriber and server are not shown for simplification; in some examples, they can be similar as described above.

In this example embodiment, the procedure proceeds as follows (the numbers below are shown in FIG. 4 in correspondence with corresponding parts of the procedure):

401. A user agent (e.g. browser) running on a subscriber's User Terminal 202 issues an HTTP request (in one example, a GET request), towards a partner's server (e.g., the partner's web server hosting the website), by way of at least components 203, 210, and 208. (For convenience, any traffic inspection of the traffic by the IEF 204 after this procedure may not be fully shown).

402. The IEF 204 forwards the message from the user agent 202 to the destination server 209. The IEF 204 may perform inspection (not shown) as illustrated in procedure 302 described above, for example.

403. The partner's server provides an HTTP response containing one or more cookies, to the IEF 204.

404. The IEF 204 inspects traffic including the HTTP response received from the partner server, to validate the response and to identify any Set-Cookie response headers. For example, in one embodiment the validation and identification are performed by IEF 204 determining whether they are protocol compliant and originate from proper partner website(s) using, e.g., existing or later-developed firewall techniques. In one example, the validation and inspection are performed to make sure the request is from a correct IP address and that the header formats meet predefined criteria.

405. The IEF 204 queries the PSF 207 to determine if the server belongs to a participating partner.

406. The policy system responds to the IEF 207 by confirming partnership (where applicable).

407. The IEF 204 stores the cookie(s) from above, along with its attributes that include at least one or more of, for example, a name (e.g. visitID) a domain name (e.g., example.com) (in the case of a cookie), host (e.g., URI, example.com), cookie expiration date (e.g. Max-Age value) and path. (e.g., .com/extension).

408. The IEF 202 forwards the response (from 403) to the subscriber's browser unchanged (i.e. including the cookie(s) stored in procedure 407).

409. The subscriber 202 issues a new HTTP request (e.g., a GET message) to the partner's server.

410. The IEF 204 inspects the traffic, including the request received from subscriber 202 in procedure 409, to identify, for example, a destination domain, path, and any included cookie headers. The IEF 204 determines based thereon that it has previously stored cookies on behalf of this subscriber for the partner website (and based on procedure 407).

411. Based on the requirements for cookie insertion, the IEF 204 modifies the HTTP request to insert the Cookie request-header(s) (i.e., the cookie(s) maintained on behalf of the visitor subscriber for the server), if they are not already present. In one example, these cookies can be ones stored above or received in the request. In another example embodiment, the Cookie-request header(s) include similar information as that described above for procedure 307 (e.g., ppv and SAID), although in other embodiments only the SAID or other information is included. An example of a GET request with an inserted Cookie-request header was set forth above. In another embodiment, one or more non-standard request headers, such as a non-standard IANA request, can be employed in this embodiment instead of a Cookie-request header.

412. The IEF 204 forwards the modified HTTP request, including the Cookie request-headers, to the partner's website, where the server 209 stores at least some information included in the request.

In spite of the subscriber's user agent capabilities, using the cookie proxy method described, the partners' server will then have successfully maintained the session state of visitors to their website for the session of interest.

In one example embodiment, the IEF 204 can also perform operations such as the procedures 303 and 304 described above (enabling subscribers to opt-out of service). Also, in an example embodiment, the Cookie proxy procedures can be combined with one or more other ones of the techniques described herein, such as, e.g., Cookie Storage and/or data collection, to enhance analytics.

Cookie Storage

A cookie storage embodiment will now be described that can solve challenges of understanding characteristics (e.g. gender, age, interest in hobbies, etc.) of visitors to partners' servers. In this example embodiment, cookie storage enables the service provider to supplement a partner's visitor tracking with service provider collected subscriber interest and demographic information. One example aspect is to extract cookies (e.g. visitor ID) from messages exchanged between a partner server and a subscriber. The cookies are stored together with the SAID, visitor demographic information, and visitor interests, in the MPS 210, for example. The visitor interests are derived using proprietary visitor interest analysis techniques, or existing or later developed visitor interest analysis techniques, based on the subscriber's activity on the network, for example. Subscriber information (i.e., including visitor interest information) stored on the MPS 210 can be retrieved by a partner server for an individual subscriber or an aggregate of subscribers, by providing previously issued cookies to the MPS 210. The MPS 210 matches the cookies received from the partner server(s) with stored cookies to identify the subscribers and returns the information describing the characteristics of the subscribers to the server(s). The choice of returning individual subscriber information compared to returning aggregate subscriber information depends upon, for example, the level of subscriber privacy required. In one example in which subscriber information is being provided one subscriber at a time, information such as the gender and age of an individual subscriber may be provided. In another example in which data is provided to a requesting server in aggregate, the MPS 210 can combine the information of plural subscribers into a response to the server indicating information such as the percentage of male and female subscribers and the average age-information for a single subscriber cannot be identified.

Figure 5:
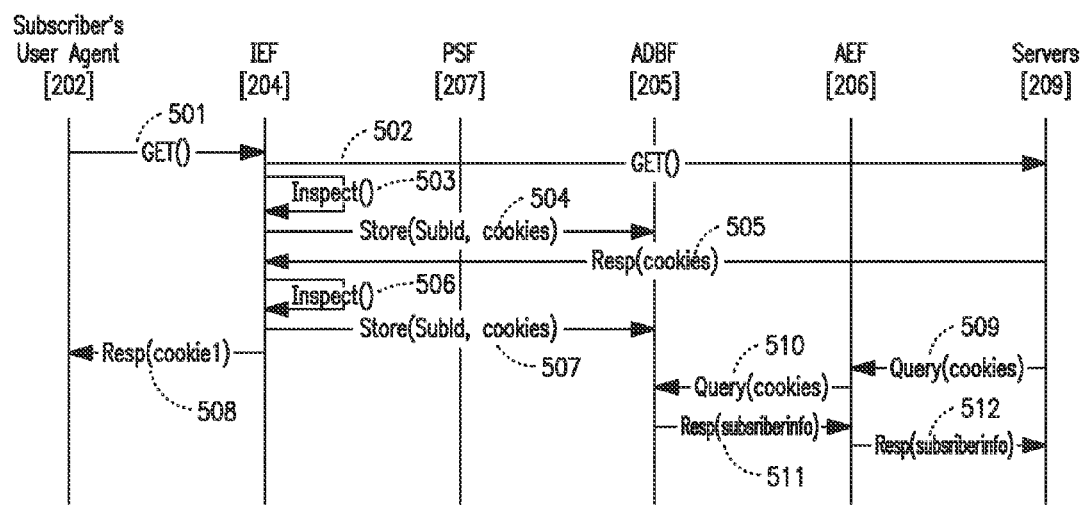
FIG. 5 is an example interaction diagram that illustrates a procedure in accordance with an example embodiment described herein, relating cookie storage.

An example interaction diagram of a procedure according to this example embodiment is shown in FIG. 5, and will be described in the context of the example communications network of FIG. 2.

For purposes of this description, in an example embodiment the following conditions are deemed to be present:

1. The subscriber 202 has chosen to opt-in to the service provider's market program.

2. The partner (i.e., proprietor or operator of sever(s) 209) has agreed to participate in the program with the service provider.

3. The subscriber 202 and partner status are stored in the policy system.

4. The ADBF 205 contains subscriber demographic (e.g. age, gender) and interest that was previously obtained from the subscriber and through inspection of traffic between the subscriber and servers.

Examples of participants in an example scenario, and their responsibilities, are set forth below in Table T-1.

TABLE T-1

Cookie Storage Participant Responsibilities

| Participant | Responsibility |
|---|---|
| Subscriber's User Agent executing on a User Terminal 202 | An opt-in Subscriber (e.g., 202). The subscriber is a visitor to the partner's server 209. |
| IEF 204 | The IEF 204 is deployed to observe messages between the subscriber's user agent 202 and the partner server 209. In this example, the IEF 204 inspects the messages for cookies and stores the results of the inspection to the ADBF 205. In other examples (i.e. FIG. 6), described herein, the IEF may inspect the traffic to build content records to create subscriber interest profiles. |

TABLE T-1-continued

Cookie Storage Participant Responsibilities

| Participant | Responsibility |
| --- | --- |
| ADBF 205 | The aggregation database function (ADBF) 205 logically represents a data store with subscriber information (e.g. demographics and interest information) aggregated from the service provider. The ADBF 205 operates in conjunction with the AEF 206 to perform analysis of the subscriber and to create analytics that can be shared with the service provider's partners. In this example, the ADBF 205 accepts requests to store cookies from the IEF 204 and requests from the AEF 206 for the stored information. |
| AEF 206 | The Analytics Engine Function 206 is responsible for deriving analytics from the data contained in the ADBF 205 and from other sources. It is also is responsible to respond to analytics requests received from the SP and partner. |
| Servers 209 | The servers 209 represent one or more partner servers where partners are the proprietors of web sites, ad agencies, ad networks, or the like. The servers receive requests and provide responses to the subscribers. In addition, the servers may request subscriber information from the AEF 206. In one example, the requests to the AEF contain the name and values of Set-cookie headers used by the server in response to subscriber requests that are used to identify a subscriber. |

A procedure according to this example embodiment proceeds as follows (the numbers 501 to 511 shown in FIG. 5 correspond to the numbered procedures 501 to 511 in the following description).

501. A user agent running on a subscriber's user terminal 202 issues an HTTP request (in one example, a GET request), towards a partner's server (i.e., the partner's server hosting the website), by way of components 203, 210, and 208.

502. In this example, the IEF 204 observes the message as it is forwarded to the server 209. In other examples, the IEF 204 may inspect, then forward the message as is done in procedure 506, for example. In this example, the subscriber's request message is not modified by the IEF; however, in other examples described herein (i.e. cookie insertion) the message may be modified.

503. The IEF 204 inspects the message passing therethrough at one or more protocol layers (e.g., one or more of the GTP, IP, TCP, HTTP, and HTML protocol layers, or other predetermined layers of interest), to identify in the request the absolute subscriber identity (e.g., the subscriber's currently assigned IP address[2], IMSI, or other predetermined subscriber identifier, each of which is also referred to herein as a subID), a predetermined identifier (e.g., a URI or IP Address) that identifies the destination server 209, and any cookies contained in the message. The GET message, for example, may contain cookie headers that were previously set by servers that share the same domain as the message's destination server 209.

[2] If NAPT is in use, the inspection can occur prior to the NAPT to preserve the identity of the subscriber.

The IEF 204 determines the participation of the subscriber and partner (not shown in this example).

504. The IEF sends a storage request message to the ABDF 205 containing the subID and cookies identified in 503, and the ABDF 205 stores them.

505. The server sends a response to the subscriber 202, and, in one example embodiment, optionally includes one or more Set-cookie response header(s).

506. In this example, the IEF 204 inspects the response message from the server then forwards it to the subscriber in step 508. Also in procedure 506, using a procedure similar to that of procedure 503, the IEF 204:
 a. determines if the publisher (e.g., associated with component 209) is a partner (not shown);
 b. determines if the subscriber 202 is participating in a marketing plan (not shown);
 c. inspects the response message for predetermined information/identifiers, such as any set cookie headers similar to in procedure 503; and
 d. determines the subscriber ID (subID) similar to in procedure 503.

507. The IEF 204 sends a storage request message to the ABDF 205 containing the subID determined in procedure 506 [and cookies identified in procedure 506, and the ABDF 205 stores them.

508. The server response message is forwarded to the requesting subscriber 202 by the IEF 204.

509. With each response to a user agent running on subscriber 202 the Server 209 may include one or more Set-Cookie requests to the user agent of subscriber 202. The server uses these cookies to maintain state information on the server's session with the user agent. In procedure 506, the IEF 204 extracts the cookies and in procedure 507 they are stored in the ABDF. The server also maintains in storage the cookies that it has issued. In message 509, the server 209 sends a query to the AEF 206 containing one or more previously issued cookies to obtain from the AEF 206 subscriber information for the submitted cookies.

510. The AEF sends query messages to the ADBF 205 containing the cookies received in procedure 509. The ADBF 205 receives the message. The ADBF 205 searches its storage for cookies previously stored (504 and 507). When a cookie is found in storage, its associated subID and the information previously stored about the subscriber are identified.

511. The ADBF 205 sends the subscriber information to the AEF 206. The AEF receives the message. In one example in which subscriber information is being provided one subscriber at a time, the ADBF 205 can return a gender and age of a single subscriber. The AEF sends to the server the gender, age, and cookie contained in the original request. In another example in which data is provided to the requesting server in aggregate, the ADBF 205 can return the gender and age of each subscriber. The AEF 206 can combine the information from the ADBF 205 into a single response to the server 209, indicating, for example, the percentage of male and female subscribers and the average age-information for a single subscriber cannot be identified.

512. The AEF sends a message to the server 209 that includes the subscriber information per subscriber or aggregate.

At the end of the procedure, cookies observed by the IEF 204 in each message exchanged are stored in the ADBF 205 or a database otherwise associated therewith. The AEF 206 uses the stored records to correlate and respond to server 209 requests.

Data Enhancement Techniques Summary

A comparison of the techniques for data enhancement can be found in the below Table T-2. The determination of which technique to employ can depend on various factors, such as platform customer input, business requirements, platform capabilities, and other applicable operating criteria.

TABLE T-2

Comparison of Data Enhancement Techniques

| Method | Persistence within and across sessions | Supplements with SP Data | Uses message-header Insertion | Storage Ranking[1] | Modification of Partner Website | Deployment In-line or Monitor |
|---|---|---|---|---|---|---|
| Cookie/Header Insertion | Y | Y | Y | 1 | Y | In-Line |
| Cookie Proxy | Y | N | Y | 2 | N | In-Line |
| Cookie Storage | N | Y | N | 3 | N | In-Line or Monitor |

Notes:
[1]Relative ranking of storage required, 1 is least storage. Storage is a combination of volatile and non-volatile and depends upon implementation Combining techniques can provide benefits of each technique, and is within the scope hereof. As but one example, using both cookie proxy and cookie storage embodiments enables a partner's website to obtain persistent cookies for its visitors and provides the ability to supplement the publisher's data with service provider demographic data.

Data Collection Embodiment

In this example embodiment, the MPS 210 inspects all traffic between a subscriber and a network, such as the Internet, and creates content records for participating subscribers and partners that are stored for analysis. The content records are analyzed using proprietary techniques, or existing or later developed techniques, to determine the characteristics and interests of the subscriber, as described above. With visibility to all traffic between the subscriber to the Internet, the traffic can be inspected and data recorded in near real time to a database for subsequent analysis.

According to one example embodiment, an AEF 206 can be identified to perform real-time and historical analysis of the collected data with access by the partner's servers or to provide visualization tools that are accessed via a web portal.

As described earlier, the MPS 210 is comprised of functions that include the IEF 204 and AEF 206 as well as other functions. These functions can be realized in one or more physical devices that comprise the MPS wherein the MPS 210 and its functions are constructed and operate according to example aspects described herein. Furthermore, the MPS functions can be deployed in a single location (e.g. the SPs network) or distributed. The IEF 204 can be deployed both in-line and/or in a monitor deployment configuration. When deployed in a monitor configuration the IEF 204 can be connected to a monitor or mirror port of a router or switch that duplicates traffic to the IEF, for example.

In some embodiments, the AEF 206 can be responsible for collecting, correlating, and analysis of data from multiple MPS and multiple service provider sites.

In an example embodiment, participants and their responsibilities are as follows:

TABLE 4-5

Participant Responsibilities

| Participant | Responsibility |
|---|---|
| Subscriber's User Agent 202 | The Subscriber's user agent executing on a User Terminal 202 may opt-out or opt-in of the services providers marketing program. Subscriber's interact with both partner and non-partner servers. |
| IEF 204 | In one example, the IEF 204 is deployed in monitor configuration that allows it to observe all traffic between the subscriber 202 and server 209. The IEF 204 inspects the traffic and records information to the ADBF 205. |
| PSF 207 | A PSF 207 stores information that is used by the IEF 204. The information includes the subscriber and partner participation in the SPs marketing program. As with other functions of the MPS, the policy system can be, e.g., functionality/software, resident on one or more components in the network, such as in, e.g., MPS 210 and/or another component, and can be combined with other functionality/software therein. Thus, the policy system may be centralized or distributed, possibly with a portion of its functionality implemented on the MPS 210. In one example, the policy system is a PCRF. |
| ADBF 205 | The aggregation database function (ADBF) 205 logically represents a data store with subscriber information (e.g. demographics) aggregated from the service provider. The ADBF 205 operates in conjunction with the AEF 206 to perform analysis of the subscriber data and to create analytics that can be shared with the service provider's partners. In this example, the ADBF 205 accepts requests and stores content records from the IEF 204. |
| AEF 206 | The AEF 206 provides analysis and visualization tools to the analyst 260. The Analytics Engine Function 206 is responsible for deriving analytics from the data contained in the ADBF 205 and from other sources. It is responsible to respond to analytics requests from the SP and partners, including partner servers 209 for analytics. In one example, the AEF 206 provides analysis and visualization tools to an analyst (not shown). |

TABLE 4-5-continued

Participant Responsibilities

| Participant | Responsibility |
| --- | --- |
| Severs | The servers 209 represent one or more non-partner and partner servers where partners are the proprietors of web sites, ad agencies, ad networks, or the like. The servers receive requests and provide responses to the subscribers. In addition, the partner servers may request subscriber information from the AEF 206. |

For purposes of this description, in an example embodiment the following conditions are deemed to be present:

a. Subscriber 202 has chosen to opt-in to the service provider's market program.

b. A partner, the proprietor of the servers, 209 has agreed to participate in the program with the service provider.

c. The subscriber 202 and partner status are stored in the PSF 207.

d. The IEF 204 is deployed in a transparent monitor mode.

Figure 6:
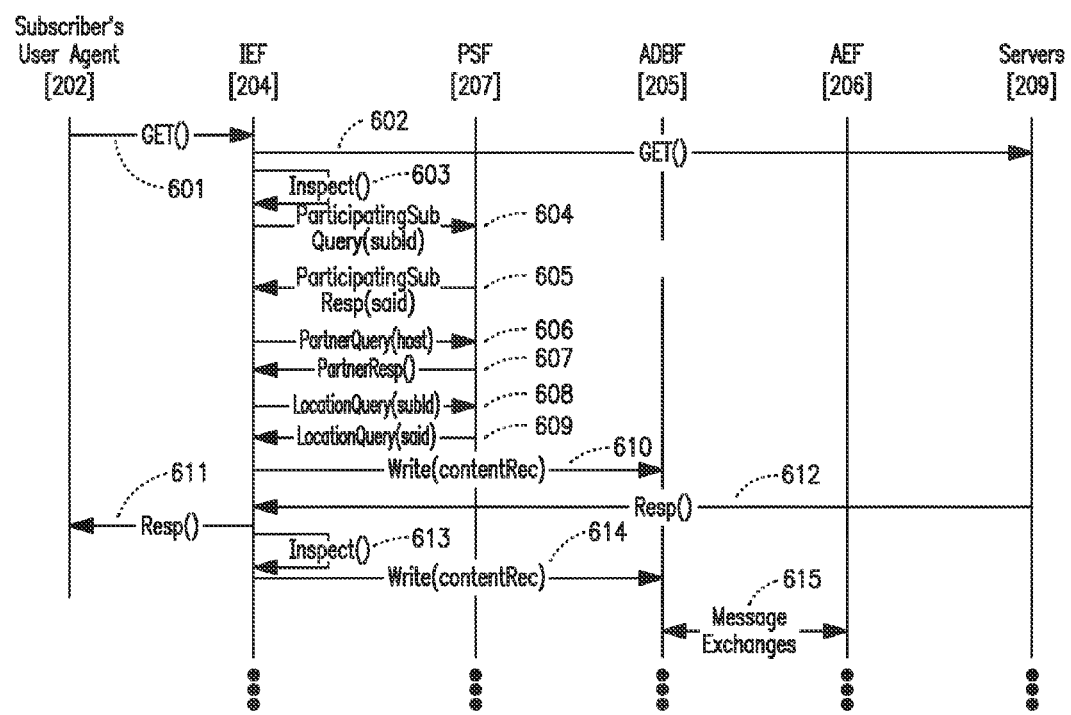
FIG. 6 is an interaction diagram that illustrates a procedure in accordance with an example embodiment described herein, relating to data collection.

An example of an interaction diagram for a procedure according to an example embodiment is represented in FIG. 6.

The procedure proceeds as follows (the numbers below correspond to the corresponding parts of the procedure depicted in FIG. 6):

601. The subscriber 202 issues a file request, such as an HTTP request, in this example a GET request, to the partner's server (e.g., to the server hosting that website).

602. In this example embodiment, to reduce delay, the IEF 204 duplicates the traffic and then forwards the traffic towards its intended destination.

603. The IEF 204 inspects the traffic at predetermined layers (e.g., layers for IP, TCP, HTTP, and HTML, or other suitable layers), and extracts predetermined fields required to create a content record (see Table 4-3 below, for an example of content records and the source of the fields).

604. The IEF 204 queries the PSF 207 to determine if the subscriber 202 is participating in the service provider's marketing programs and obtains the subscriber anonymous ID (SAID) in response (605).

606. The IEF 204 queries the PSF 207 to determine if the destination server belongs to a participating partner, and the PSF responds confirming partnership (607), where applicable.

608. In one example, the IEF 204 queries the PSF 207 to determine the location of the subscriber 202 returned in a response from the PSF indicating the location (609). For example, the location can be a physical location, based on a source IP address, a mobile location based on GPS, or other location type, depending on predetermined operating criteria. The location is recorded in the content record. In another example, the IEF 204 derives the mobile location through a mix of inspection (603) and database query.

610. After constructing the content record from its constituent parameters (i.e., the information obtained by the IEF 204 in procedures 603 to 609), the IEF 204 sends a message using known (or later-developed) techniques to the ADBF 205 containing the content record (i.e., such a record can be formed using, e.g., known techniques). The ADBF 205 receives the message and stores the information for subsequent retrieval by the AEF 206 for derivation of analytics data.

612. The partner server (e.g., a server in network 201) responds to the GET request by providing a response to the subscriber 202.

611. In one example, the IEF 204 duplicates the response and forwards it to the subscriber 202.

613. The IEF 204 inspects the response passing therethrough at one or more protocol layers (e.g., one or more of the GTP, IP, TCP, HTTP, and HTML protocol layers, or other predetermined layers of interest), to extract data fields that are used as entries into a content record (see Table 4-3 below, for an example of content records and the source of the fields). In one example, the IEF 204 inspects the traffic for the HTTP HOST header to identify the authority.

614. The IEF 204 sends a message containing the content record to the ADBF 205 for storage. Example content records are represented in Table 4-3, although of course the scope of the invention is not limited only thereto.

615. The ADBF 205 and AEF 206 exchange messages in real-time shown as message exchanges in the Figure. Using proprietary techniques, or existing or later developed techniques, the AEF 206 analyzes the content records provided by the ADBF 205 for individual subscriber as well as groups of subscribers to derive useful information (e.g., characteristics) about the subscriber. (Not shown in the diagram, the AEF 206 accepts requests for analytics data from the SP and partner servers as well as analysts.)

At the end of the procedure, a content record has been generated for each message exchanged and is stored in the ADBF 205 or a database otherwise associated therewith. The AEF 206 uses the records to analyze the content, performance, and update subscriber interests. As an example, an analyst (not shown) for the partner can request that the AEF 206 correlate subscriber information to construct a composite view for the subscribers that have visited their site.

Table A illustrates an example aggregation for the number of visitors to a partner's website.

TABLE A

| Parameter | Value |
| --- | --- |
| Unique Visitors | 5,234 |
| Average Age | 32 |
| Median Age | 30 |
| Age Deviation | 4 |
| Central Location | Springfield |
| Peak Time | 1432Z |
| Male | 74% |
| Female | 26% |

In one example embodiment, the SAID is used in this embodiment in the same manner as in the Cookie Storage embodiment. For convenience, its use is not represented in FIG. 6, but it is the same as described above for the Cookie Storage embodiment.

There may be cases when the server is not participating in the service provider's analytics program; however, it may still be desirable to collect data as it may provide a technique to recruit new customers for the service, and the data can be used to build a participating subscriber's interest profile. Thus, the implementation herein can be used for those situations as well.

In some embodiments, the procedure can be modified to account for situations where there are restrictions on the inspection of traffic for non-participating subscribers.

Content Records

An example of a content record (e.g., items to collect for the ADBF database) is listed in Table 4-3. These items may be grouped into one or more records when written to the database, although this example is not exclusive or limiting to the scope of the invention.

TABLE 4-3

Example Content Records

| Parameter | Source | Discussion |
|---|---|---|
| SAID | Policy System | Provides an anonymous persistent identification for the subscriber to correlate all records from a particular subscriber 202 over time. If the data is shared with partners, the SAID should not be traceable to the subscriber 202 by the partners. |
| IP Address | IP Layer | The IP address for source and destination is used to identify servers contacted. Both pre- and post-NAPT addresses are desireable. |
| Host | HTTP | The host field in the HTTP GET request is used to identify the authority (host) contacted. |
| Device Type | Policy System | Device making request. Used to model types of visitors to site and to focus development of compatibility of website with the devices used to access the site most often. |
| Set Cookie | HTTP | Cookies will often contain user and session IDs. Recording this information allows correlation between the data collected by the partner's server and that collected by the SP. |
| Referer with Query String | HTTP | Used to determine the source of visitors to a site |
| Cookie | HTTP | Cookies submitted by the user-agent to identify itself and provide its state to the server |
| Content-type | HTTP | Identifies the data included in the HTTP payload. This can range from plain text, icons, audio, video, applications. Content-type is used for network analytics to determine how the network is being used. It can also be used for aggregation of web analytics to determine trends for applications and media types. |
| title | HTML | Titles for pages visited |
| Timestamp | MPS 210 | Time stamps on collected data allow calculation of data throughput and performance, determination of responsiveness, and correlation of the data collected with data collected by other sites. |
| Subscriber Mobile Location | PSF or IEF | User mobile location |
| Subscriber Home Location | PSF | Subscriber home location. The location where the mobile device is registered. |

Cookie Insertion with in-Band Analytics Data

In one example embodiment, the concepts of cookie insertion and data collection are combined to identify the subscriber to the server and to provide analytics data about the subscriber, called the interest profile, to the server. As described in the Data Collection Embodiment, the interest profile reflects the subscriber's interests built by using the history of interaction with website servers (e.g. as reflected in the content records created for that subscriber) and using proprietary methods to predict the subscriber's future behavior.

An example of participants that may be involved in one example embodiment, and their responsibilities, is represented in the following Table B.

TABLE B

| Participant | Responsibility |
|---|---|
| Subscriber's User Agent executing on a User Terminal 202 | Subscriber 202 interacts with the Partner's website server |
| IEF 204 | In one example, the IEF 204 inspects the messages between the subscriber 202 and server 209 to collect information on user interests. This information is written to the ADBF. |
| PSF 207 | The PSF 207 stores information on participating subscribers 202 and partner website servers 209. For simplicity, the PSF and its interactions are not shown in the scenario that is described in FIG. 8. |
| ADBF 205 | The aggregation database function 205 is responsible for storage of content records that it receives from the IEF 204. |
| AEF 206 | The AEF 206 is responsible for the analysis of the data stored in the ADBF 205. The AEF constructs user interest profiles from the ADBF supplied data that are included in the messages forwarded by the IEF 204 to the partner's servers 209. The AEF updates the participating subscriber's profile in real-time. On request, the AEF provides the interest profile to the IEF 204 for inclusion in messages to the server 209. |
| Partner's Server 209 | The partner's server accepts requests from and provides responses to subscribers 202. The Partner server may be part of a website, ad network, data exchange, or the like. |

For purposes of this description, in an example embodiment that will now be described, the following conditions are deemed to be present:
1. An example subscriber has chosen to opt-in to a service provider's marketing program.
2. A partner (e.g., a publisher) with servers 209 has agreed to participate in the program with the service provider.
3. The PSF 207 has been previously configured to indicate the participation.

Figure 8:
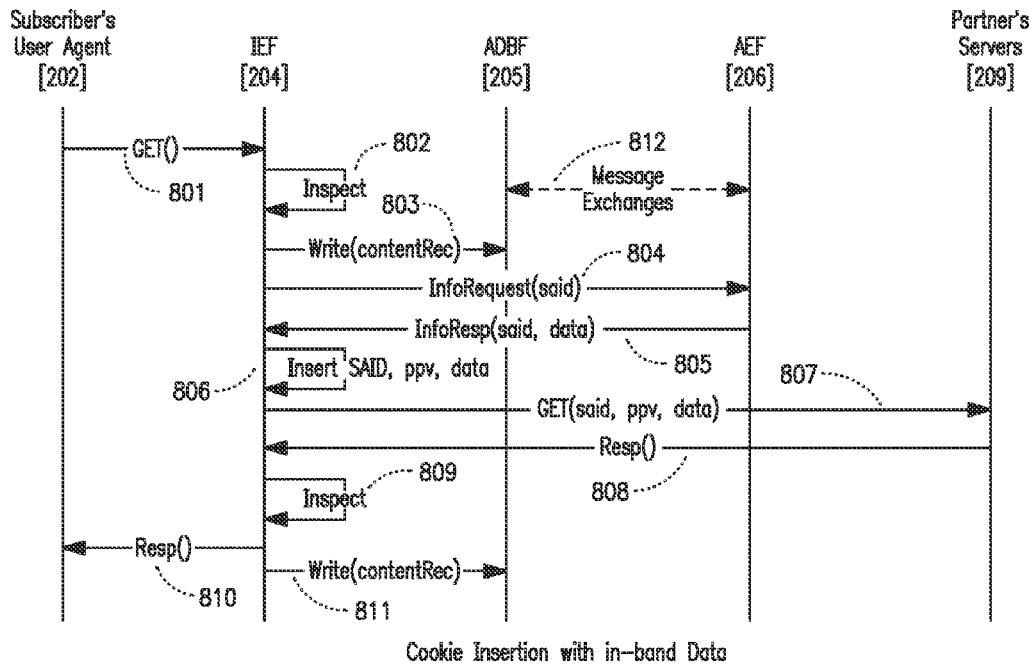
FIG. 8 is an interaction diagram that illustrates a procedure in accordance with an example embodiment described herein, relating to cookie insertion with in band data.

An example interaction diagram representing a procedure for this example embodiment is shown in FIG. 8.

In this example embodiment, the PSF 207 and associated queries to determine participation of the subscriber and server are not shown for simplification. The procedure proceeds as follows (the numbers below identify the corresponding parts of the procedure in FIG. 8):

801. A user agent running on a user terminal 202 issues a message including an HTTP request (in one example, a GET request), towards a partner's server 209, by way of components 203, 210, and 208.

802. The IEF 204 inspects the message to extract information from predetermined fields, for the content record (e.g., such as like in procedure 603 above). Not shown in the Figure, the IEF 204 queries the PSF to determine the participation and the SAID for the subscriber.

803. The IEF 204 assembles the information from the inspection and PSF into a content record that it forwards to the ADBF 205.

804. The IEF 204 queries the AEF 206 for the subscriber's 202 interest profile that was created using, e.g., procedures previously described. The AEF 206 constructs the interest profile using data supplied by the ADBF 205 and other SP databases. The interaction between the AEF 206 and ADBF 205 is illustrated by 812

805. The AEF 206 sends a response to the IEF 204 containing the interest profile indicated by data in the Figure.

807. The IEF inserts the SAID, partner provided value, and interest profile into the GET request, and then forwards the request to the partner's server 209.

808. The Server 209 customizes the response to the subscriber 202 using the data received in the GET request (807) that includes the interest profile added to the request by the IEF in (806). The Server then sends the response toward the subscriber 202.

809. The IEF 204 inspects the response from the Partner's server 209 to create a content record based on the information in the response. (See, e.g., Table 4-3 for an example of content records).

810. The IEF 204 forwards the response to the subscriber 202.

811. The IEF 204 sends a message containing the content record to the ADBF 205. The ADBF receives and stores the content record. Example content records are represented in Table 4-3, although of course the scope of the invention is not limited only thereto.

The message exchange depicted in FIG. 8 is repeated as needed for each request and response between the subscriber and server. With each message exchange, additional content records are provided to the ADBF 205 for use by the AEF 206 in constructing the user interest profile. Over time the interest profile becomes more refined with the additional information.

In the example scenario depicted in FIG. 8, the IEF 204 is—in-line between the subscriber's user agent 202 and the partner's server 209. For each request from a subscriber, the IEF 204, in real-time, queries the AEF 206, for the data to forward to the server 209.

In one example embodiment, of FIG. 8, the SAID may be omitted from the GET request (807) to further protect the identity of the subscriber. Alternatively, the SAID can be changed from time to time or as frequently as every request to the server. (In one example of each embodiment described in the present application, the SAID can be changed in such a manner).

In addition, if the partner's partner provided value (ppv) is not needed or unused by the partner server 209, it may be omitted from the message in procedure 807.

In one example embodiment, the server is part of an advertising network. The subscriber's interest profile is used by one or more components of FIG. 2 to provide the subscriber with an advertisement of a product that reflects their interest rather than a randomly selected advertisement.

Cookie Insertion with Out of Band Data

In another example embodiment, the concepts of cookie insertion and data collection are combined to identify the subscriber to the partner's server and to provide analytics data about the subscriber, called the interest profile, to the server in real-time to allow the server to provide a more relevant response to the subscriber. The interest profile reflects the subscriber's interests built by using the history and content of the subscriber's message exchanges with one or more servers and then using proprietary methods to predict the subscriber's future behavior.

This example embodiment is described using the example communications network diagram of FIG. 2.

An example of participants that may be involved in one example embodiment, and their responsibilities, is represented in the following Table C.

TABLE C

| Participant | Responsibility |
| --- | --- |
| Subscriber's User Agent executing on a User Terminal 202 | Subscriber 202 interacts with servers via the MPS over the connected networks |
| IEF 204 | In one example, the IEF 204 inspects the messages between the subscriber 202 and server 209 to collect information on user interests that is placed into content records and stored to the ADBF 205. |
| PSF 207 | The PSF 207 stores information on participating subscribers 202 and partner's server 209. The PSF functions similarly to the example of FIG. 3 therefore, for simplicity, the PSF and its interactions are not included in the scenario that is described in FIG. 9. |
| ADBF 205 | The Aggregation Database Function 205 is responsible for storage of content records that it receives from the IEF 204 providing the stored information to the AEF 206 as requested. |
| AEF 206 | The AEF 206 constructs user interest profiles from content records stored on the ADBF using, e.g., proprietary procedures. The AEF updates the participating subscriber's interest profile in real-time. On request, the AEF provides the interest profile to a server 209. |
| Server 209 | The servers accept requests from and provide responses to subscribers 202. A partner server may request additional information on the subscriber (e.g. the interest profile) from the AEF 206 using the subscriber SAID. |

For purposes of this description, in an example embodiment that will now be described, the following conditions are deemed to be present:

1. An example subscriber has chosen to opt-in to a service provider's marketing program.
2. A partner with servers 209 has agreed to participate in the program with the service provider.
3. The PSF 207 has been previously configured to indicate the participation of subscribers and partners.

Figure 9:
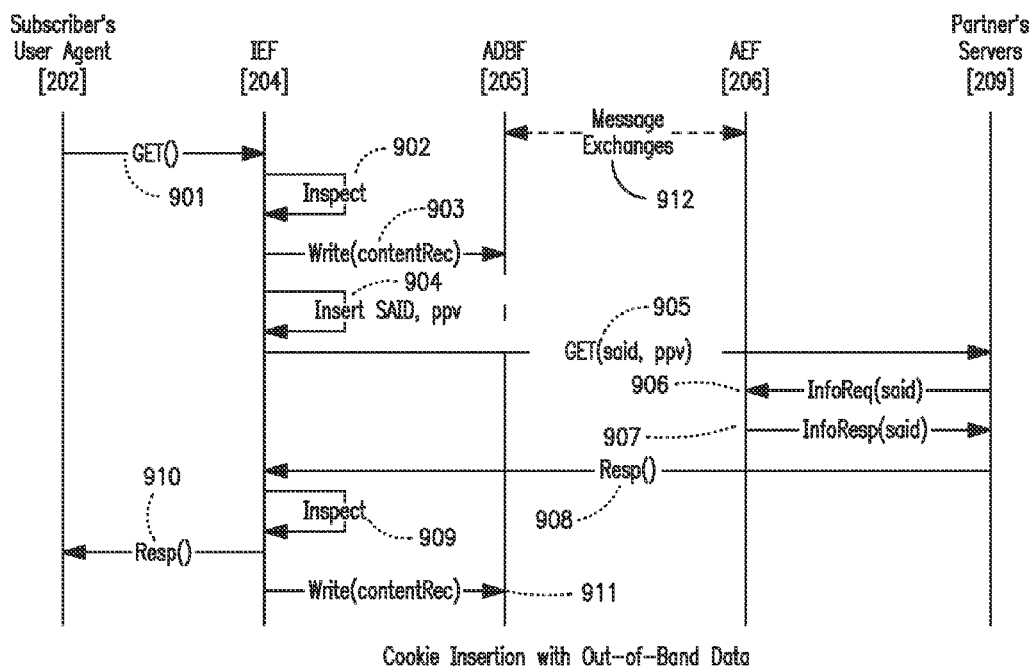
FIG. 9 is an interaction diagram that illustrates a procedure in accordance with an example embodiment described herein, relating to cookie insertion with out of band data.

An example interaction diagram representing a procedure for this example embodiment is shown in FIG. 9.

In this example embodiment, the PSF 207 and associated queries used to determine participation of the subscriber and server are not shown for simplification. The procedure proceeds as follows (the numbers below identify the corresponding parts of the procedure in FIG. 9):

901. A user agent running on a User Terminal 202 issues an HTTP request (in one example, a GET request), towards a server, by way of at least components 203, 204, and 208.

902. The IEF 204 inspects the message to extract information for a content record, in a similar manner as described above. (Not shown in the Figure for convenience, the IEF 204 queries the PSF 207 to retrieve the subscriber's participation and server's participation. For the participating subscriber, the SAID is retrieved from the PSF. For the participating server, the ppv is retrieved from the PSF).

903. The IEF 204 sends the content record created for this transaction to the ADBF 205.

904 The IEF 204 inserts the SAID and ppv into the request message.

905. The IEF 204 sends the modified request, including the insertions from procedure 904, to the partner server 209.

906. The server 209, upon receiving the request with the SAID and ppv, sends a message (which may include the SAID and/or ppv) to the AEF 206 requesting additional information about the subscriber so that it may tailor its response for the specific subscriber.

907. The AEF 206, based on the SAID provided by the server 209, retrieves the corresponding interest profile or a subset thereof and sends the information to the server.

908. The Server 209 customizes the response to the subscriber 202 using the data received in the GET request (905) and profile or subset provided in procedure 907. The Server 209 then sends the response toward the subscriber 202. In one example of customization, the server is an advertising server and must provide an advertisement from categories of either sports or finance. Using the information in the interest profile provided by the IEF, the server determines that the visitor is interested in sports and offers a sports related advertisement. Of course, this specific example is for purposes of illustration only, and is not intended to be limiting to the scope herein. In other example, other types of customization can be employed.

909. The IEF 204 inspects the response from the Partner's server 209 to create a content record based on the information in the response. (See, e.g., Table 4-3 for an example of content records).

910. The IEF 204 forwards the response to the subscriber 202.

911. The IEF 204 sends a message containing the content record to the ADBF 205 205. The ADBF 205 receives the message and stores the content record. Example content records are represented in Table 4-3, although of course the scope of the invention is not limited only thereto.

For the preceding example, if the server is non-participating, the IEF inspects the traffic, sends the content record to the ADBF, but does not insert the SAID or ppv into the GET request.

For the preceding example, if the subscriber is non-participating, the IEF does not send a content record to the ADBF (903) and does not insert the SAID or ppv into the server request (905).

In this example, the subscriber interest profile is not automatically included in the GET request sent from the IEF 204 to the server 209. Instead additional messages are exchanged (906 and 907) between AEF 206 and server 209, referred to as out of band messages. This provides several benefits. The communication path between the server 206 and AEF 209 can be encrypted to further protect subscriber privacy. A security association between the AEF 206 and sever 209 can be established that requires mutual authentication. The server 209 has the option to request additional subscriber information only when it is needed.

To further protect the privacy of the subscriber 202, the value of the SAID can be changed from time to time or as frequently as every request to the partner server.

Alternatively, instead of the server requesting information from the AEF for each individual request of the server, the server can store the SAIDs from each request. Then at a later time, the server can issue a single request to the AEF with a list of received SAIDs. The AEF retrieves the interest profile for each subscriber based on the SAID, aggregates the information into a single subscriber interest profile that represents a typical subscriber and provides this in a single response to the server. This technique further obscures the subscriber's individual identify protecting their privacy and reduces the amount of data exchanged.

SAID Considerations

The SAID is used to protect subscriber identities, allowing information about the subscriber to be shared anonymously. The SAID in one example is unique for each subscriber; however, it can change over time, and in other example, the SAID can identify more than a single subscriber. It should not be possible to identify the subscriber from the SAID. One example method to achieve this is to use a one way hash to calculate the SAID from information that uniquely identifies the subscriber. Given the same information, the hash yields the same result; but, given the SAID it is not possible to calculate the original subscriber identify, thus protecting the subscriber's privacy.

Another way to protect a subscriber's personal information according to an example aspect herein is to periodically change the value of the subscriber's SAID. For example, from time-to-time or perhaps for each transmission of the SAID to a partner server, the SAID is changed. Changing the SAID often, prevents partners from collecting information on any particular subscriber.

TERMINOLOGY

TABLE 5

Terminology

| Term | Description |
| --- | --- |
| conversion | Converting of a website visit to a desired outcome, typically a registration or purchase. |
| Landing page | The first page accessed by a visitor to a website. |
| OTT | Over the top - refers to applications that run above the IP layer without service provider interaction or support. |
| Page view | The transmission of a website page to a user-agent. |
| publisher | In the context of web analytics, any individual or organization that produces a website for access by others. |
| Network Service Provider | In the context of this document, a service provider is an entity that provides a telecommunications services to companies and individuals. |
| SP | Abbreviation for service provider |
| Uniques | A count of unique visitors to a website. A unique visitor is identified as the same visitor rather than as a new visitor when they return to the website. |
| Visitor | An individual or spider that interacts with a publisher's website. |
| Web analytics | Web analytics is primarily used to understand the behavior of website visitors accessing a website via web browser or smart phone application. |

It should be noted that the network configuration represented in FIG. 2 is merely illustrative in nature, and should not be construed as being limiting to the scope of the invention. For example, in other embodiments, the network may have other configurations, and the interfaces between the depicted equipment may be different than those described above. It also should be noted that the information appliances (subscribers) 150, 202 described herein may include, for example, remote personal computers, handheld personal digital assistants with wireless capability, cellular phones, pagers, and any other suitable types of information appliances. The number and variety of them which may be communicating through the network 100, 201 can vary widely, depending upon the size of the enterprise providing network 100, 201, its needs, users' needs and geographic location(s), applicable design/system operating criteria, etc.

The servers (e.g., 110, 114, 118, 209, and host server(s)) are, in one non-limiting example, a computer or farm of computers that facilitate the transmission, storage, and reception of such information and other data between different points. From a hardware standpoint, in one example a server computer will typically include one or more components, such as one or more microprocessors (also referred to as "controllers") (not shown), for performing the arithmetic and/or logical operations required for program execution. Also in one example, a server computer will also typically include disk storage media (also referred to as a "memory"), such as one or more disk drives for program and data storage, and a random access memory, for temporary data and program instruction storage. From a software standpoint, in one example a server computer also contains server software resident on the disk storage media, which, when executed, directs the server computer in performing its data transmission and reception functions. As is well known in the art, server computers are offered by a variety of hardware vendors, can run different operating systems, and can contain different types of server software, each type devoted to a different function, such as handling and managing data from a particular source, or transforming data from one format into another format.

Figure 7:
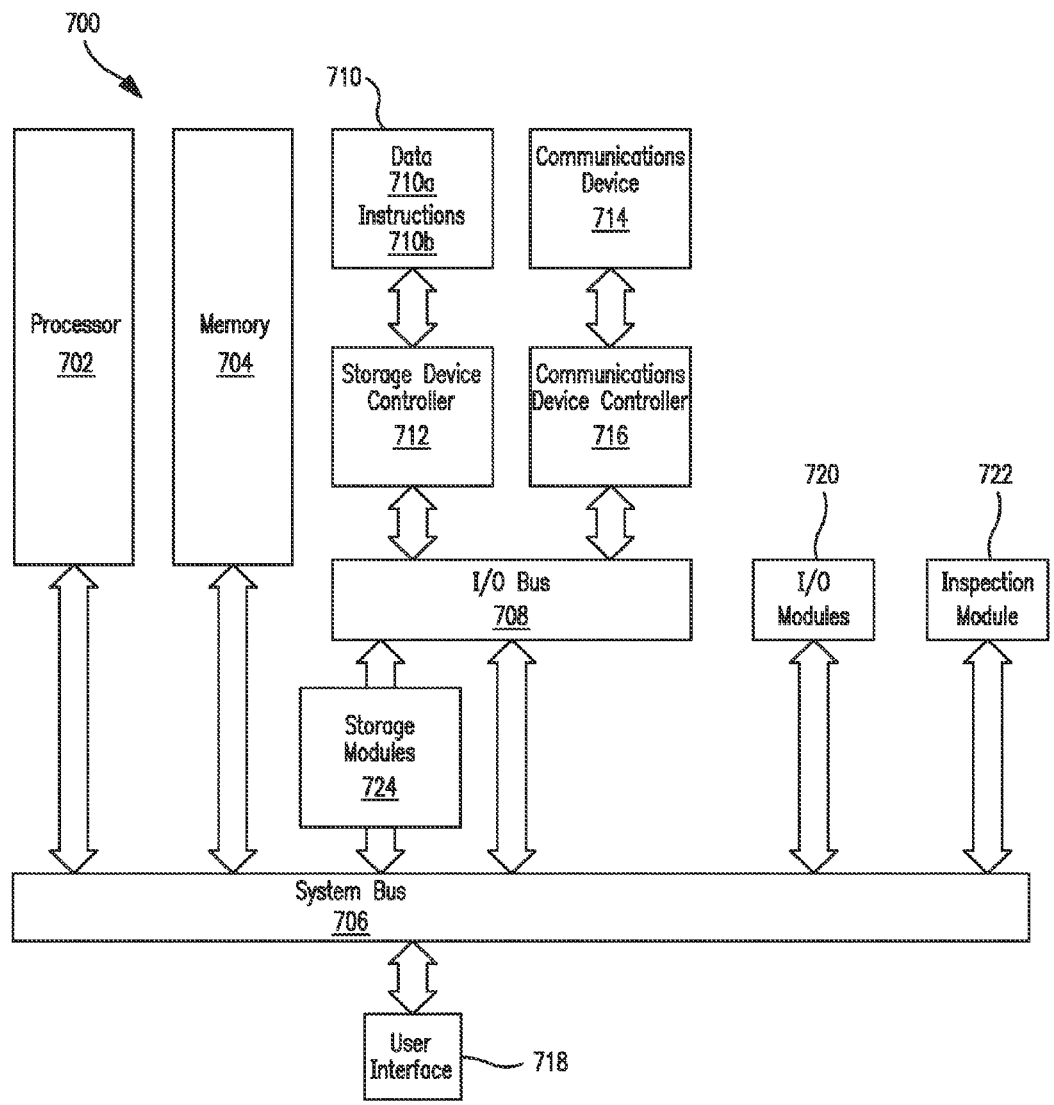
FIG. 7 is an architecture diagram of a processing system in accordance with an example embodiment described herein.

Reference is now made to FIG. 7, which is an architecture diagram of an example data processing system 700, which in one example embodiment, can further represent individual ones of the components of FIGS. 1 and 2 (e.g., 150, 110, 114, 116, 118, 202, 209, 210, and host server(s)). Data processing system 700 includes a processor 702 coupled to a memory 704 via system bus 706. Processor 702 is also coupled to external Input/Output (I/O) devices (not shown) via the system bus 706 and an I/O bus 708, and at least one input/output user interface 718. Processor 702 may be further coupled to a communications device 714 via a communications device controller 716 coupled to the I/O bus 708. Processor 702 uses the communications device 714 to communicate with other elements of a network, such as, for example, network nodes, and the device 714 may have one or more input and output ports. Processor 702 also can include an internal clock (not shown) to keep track of time, periodic time intervals, and the like.

A storage device 710 having a computer-readable medium is coupled to the processor 702 via a storage device controller 712 and the I/O bus 708 and the system bus 706. The storage device 710 is used by the processor 702 and controller 712 to store and read/write data 710a, as well as computer program instructions 710b used to implement the procedure(s) described above and shown in the accompanying drawing(s) herein (and, in one example, to implement the functions represented in FIG. 2). In operation, processor 702 loads the program instructions 710b from the storage device 710 into the memory 704. Processor 702 then executes the loaded program instructions 710b to perform any of the example procedure(s) described herein, for operating the system 700.

I/O modules 720 that interconnect with the I/O bus 708 provide interfaces that allow the system to interconnect with other devices via one or more LANs, WANs, or other types of networks.

In some realizations, inspection modules 722 that interconnect with the system bus 706, are used to inspect data passing there-through at one or more protocol layers (e.g., one or more of the GTP, IP, TCP, HTTP, and HTML protocol layers, or other predetermined layers of interest), as one form of realization of the IEF 204.

In some realizations, storage modules 724 that interconnect with the system bus 706 and/or I/O bus 708 are used for storage and retrieval of content record. The storage modules may be realized using additional memory, solid state disk drives, rotational media, or the like.

In some example embodiments, one or more of the functions represented in FIG. 2 can be realized in one or more of the components shown in FIG. 7.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium", "machine readable medium", or "memory" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs. Indeed, the numbered parts of the above-identified procedures represented in the drawings may be representative of operations performed by one or more respective modules, wherein each module may include software, hardware, or a combination thereof.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

In addition, it is not necessary that the procedures performed by the analysts be done with a computer, and instead they can be performed by a human operator.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

TABLE 6

References

| ID | Reference |
|---|---|
| [Cookie RFC 2109] | HTTP State Management Mechanism, IETF, RFC 2109, February 1997, HTTP://tools.ietf.org/html/rfc2109 |
| [Cookie RFC 2965] | HTTP State Management Mechanism, IETF, RFC 2965, October 2000, HTTP://tools.ietf.org/html/rfc2965 |
| [Cookie Netscape] | Persistent Client State HTTP Cookies, Netscape, undated |

What is claimed is:

1. A procedure for operating a communication network including a network device that is in communication in the network with a plurality of user communication terminals and a plurality of servers that provide content, the procedure comprising:

at the network device included at a service provider core,
inspecting communications between individual ones of the user communication terminals and the plurality of servers;
inserting, in at least one of the communications, at least one of an identifier of one of the user communication terminals involved in the at least one communication and an identifier of one of the servers involved in the at least one communication;
based on the communications inspected in the inspecting, aggregating information indicating interests of users of the individual ones of the user communication terminals, the interests being for content provided by various ones of the plurality of servers;
based on a history of information obtained in the aggregating and a prediction of future communication interactions between the individual ones of the user communication terminals and the servers, deriving at least one interest profile for each of the users, the at least one interest profile for each respective user defining an interest of that respective user in content provided by the various ones of the servers;
determining whether one or more of the user communication terminals and servers have opted in; and
providing the at least one interest profile derived for each respective user to the various ones of the servers such that the various ones of the servers provide content customized based on each at least one interest profile.

2. The procedure of claim 1, wherein the identifier of the one of the user communication terminals is a subscriber anonymous ID.

3. The procedure of claim 1, wherein at least one of the communications includes a http message.

4. The procedure of claim 3, wherein the http message includes a GET request.

5. The procedure of claim 1, wherein in the inserting, the at least one of the identifiers is inserted in one of a Cookie request header and a Non-Standard Internet Assigned Numbers Authority (IANA) Request Header.

6. The procedure of claim 2, wherein the subscriber anonymous ID enables the servers to recognize the one of the user communication terminals.

7. The procedure of claim 2, wherein the subscriber anonymous ID is non-constant.

8. The procedure of claim 1, further comprising:
receiving at least one of the identifiers from one of the servers;
storing the at least one identifier; and
providing the at least one identifier to one of the user communication terminals.

9. The procedure of claim 1, wherein the at least one interest profile for at least one of the users is provided to at least one of the various ones of the servers in a same one of the communications as that in which at least one of the identifiers is inserted.

10. The procedure of claim 1, wherein the identifier of the one of the servers is a partner provided value.

11. An apparatus operating in a communication network, and in communication in the network with a plurality of user communication terminals and a plurality of servers that provide content, the apparatus comprising:

at least one communication interface, arranged to receive communications effected between individual ones of the user communication terminals and the plurality of servers; and at least one processor coupled to the at least one communication interface, and arranged to
inspect the communications received by the at least one communication interface,
insert, in at least one of the communications, at least one of an identifier of one of the user communication terminals involved in the at least one communication and an identifier of one of the servers involved in the at least one communication,
based on the communications inspected, aggregate information indicating interests of users of the individual ones of the user communication terminals, the interests being for content provided by various ones of the plurality of servers,
based on a history of the information aggregated and a prediction of future communication interactions between the individual ones of the user communication terminals and the servers, derive at least one interest profile for each user, the at least one interest profile for each respective user defining an interest of that respective user in content provided by the various ones of the servers;
determine whether one or more of the user communication terminals and servers have opted in; and
provide, by way of the at least one communication interface, the at least one interest profile derived for each respective user to the various ones of the servers such that the various ones of the servers provide content customized based on each at least one interest profile,
the apparatus being included at a service provider core.

12. The apparatus of claim 11, wherein the identifier of the one of the user communication terminals is a subscriber anonymous ID.

13. The apparatus of claim 12, wherein the subscriber anonymous ID is non-constant.

14. The apparatus of claim 11, wherein at least one of the communications includes a http message.

15. The apparatus of claim 14, wherein the http message includes a GET request.

16. The apparatus of claim 12, wherein the processor inserts the at least one of the identifiers in one of a Cookie request header and a Non-Standard Internet Assigned Numbers Authority (IANA) Request Header.

17. The apparatus of claim 12, wherein the subscriber anonymous ID enables the servers to recognize the one of the user communication terminals.

18. The apparatus of claim 11, wherein the communication interface also is arranged to receive the at least one identifier from one of the servers, and the processor also is arranged to store the at least one identifier and provide the at least one identifier to one of the user communication terminals by way of the communication interface.

19. The procedure of claim 1, wherein at least one of the identifiers includes a cookie.

20. The procedure of claim 1, further comprising providing subscriber characteristic information based on at least one of the identifiers.

21. The procedure of claim 1, further comprising storing at least one of the identifiers.

22. The procedure of claim 20, further comprising receiving a query including one or more identifiers, wherein the providing of the subscriber characteristic information includes correlating subscriber characteristic information with at least one of the identifiers.

23. The procedure of claim 22, wherein the subscriber characteristic information is for a plurality of subscribers.

24. The apparatus of claim 11, wherein at least one of the identifiers includes a cookie.

25. The apparatus of claim 11, wherein the at least one processor also is arranged to provide subscriber characteristic information based on at least one of the identifiers.

26. The apparatus of claim 11, further comprising a memory arranged to store at least one of the identifiers.

27. The apparatus of claim 25, wherein the at least one processor also is arranged to receive a query including one or more identifiers, and provides the subscriber characteristic information by correlating subscriber characteristic information with at least one of the identifiers.

28. The apparatus of claim 25, wherein the subscriber characteristic information is for a plurality of subscribers.

29. The apparatus of claim 25, wherein the subscriber characteristic information includes gender information for at least one subscriber.

\* \* \* \* \*